(12) United States Patent
Deal

(10) Patent No.: US 11,617,314 B2
(45) Date of Patent: Apr. 4, 2023

(54) SELF-WICKING PLANT GROWTH RECEPTACLE

(71) Applicant: Gerrad Deal, Sparta, WI (US)

(72) Inventor: Gerrad Deal, Sparta, WI (US)

( * ) Notice: Subject to any disclaimer, the term of this patent is extended or adjusted under 35 U.S.C. 154(b) by 11 days.

(21) Appl. No.: 17/459,199

(22) Filed: Aug. 27, 2021

(65) Prior Publication Data

US 2022/0078984 A1 Mar. 17, 2022

Related U.S. Application Data

(60) Provisional application No. 63/078,121, filed on Sep. 14, 2020.

(51) Int. Cl.
*A01G 27/00* (2006.01)
*A01G 27/06* (2006.01)

(52) U.S. Cl.
CPC ..................... *A01G 27/06* (2013.01)

(58) Field of Classification Search
CPC ......... A01G 27/00; A01G 27/04; A01G 27/06
See application file for complete search history.

(56) References Cited

U.S. PATENT DOCUMENTS

| | | | |
|---|---|---|---|
| 8,091,279 B2 | 1/2012 | Stewart | |
| 9,241,452 B2 * | 1/2016 | Stewart | A01G 25/00 |
| 9,352,901 B2 * | 5/2016 | Furrow | A47G 19/22 |
| 9,439,370 B2 * | 9/2016 | Donnelly | A01G 9/04 |
| 2006/0112634 A1 | 6/2006 | Vogt | |
| 2007/0089366 A1 | 4/2007 | Kasatshko | |
| 2007/0180766 A1 | 8/2007 | Wilkes | |
| 2010/0077661 A1 * | 4/2010 | Brandstatter | A01G 9/02 47/80 |
| 2015/0033625 A1 * | 2/2015 | Jawarski | A01G 9/02 |
| 2017/0303481 A1 * | 10/2017 | Marshall | A01G 27/00 |
| 2018/0064043 A1 * | 3/2018 | Allen | A01G 29/00 |

FOREIGN PATENT DOCUMENTS

DK 2255613 A1 * 5/2010 ............. A01G 27/00

* cited by examiner

*Primary Examiner* — Joshua J Michener
*Assistant Examiner* — Henry Hooper Mudd
(74) *Attorney, Agent, or Firm* — Boudwin Intellectual Property; Daniel Boudwin

(57) ABSTRACT

A self-wicking plant growth receptacle is provided. The device includes a housing having a base opposite and upper side and a plurality of sidewalls extending therebetween. An upper opening is disposed through the upper side providing access to an interior volume dimensioned to removably receive a grow bag therein. A wick port is disposed through the base in fluid communication with the interior volume. A reservoir housing is securable to the base to define an assembled configuration. The reservoir housing includes a lower side and a perimeter sidewall defining a reservoir volume. A lip is disposed about a perimeter of the upper side, wherein the lip includes a plurality of apertures therethrough. A channel extends through the housing between an inlet on the upper side and an outlet on the base, wherein the channel is in fluid communication with the reservoir volume. A filter is removably secured within the channel.

17 Claims, 4 Drawing Sheets

SELF-WICKING PLANT GROWTH RECEPTACLE

CROSS REFERENCE TO RELATED APPLICATIONS

This application claims the benefit of U.S. Provisional Application No. 63/078,121 filed on Sep. 14, 2020. The above identified patent application is herein incorporated by reference in its entirety to provide continuity of disclosure.

BACKGROUND OF THE INVENTION

The present invention relates to plant growth systems. More particularly, the present invention pertains to a self-wicking plant growth receptacle having integral plant training apertures and water filtration means.

Many individuals enjoy gardening or growing plants indoors, however, doing so can be difficult as indoor plant growth requires more precise control over the plant's supplied water and light. Particularly, indoor plants often fail to efficiently grow indoors without constant monitoring and maintenance by a gardener. Failure to properly monitor the plant and provide sufficient water and light can result in stilted growth or the death of a plant. Most frequently, underwatering or overwatering are the most common cause of failure for indoor plant growth, as it can be difficult to ascertain how much water a particular plant requires at a given time. Passive watering systems that allow the natural absorbency of the soil in which the plant is rooted to control the water supplied to the plant more frequently produce healthy plants. Improper plant maintenance can have particularly devastating results as many plants are grown over an extended length of time, such that stilted growth or plant death represent a significant loss of time investment.

Furthermore, even should typical indoor gardeners properly water and maintain their plants, the quality of the water itself may negatively impact plant growth. Often, individuals use tap water or bottled water to water plants which may include added chemicals and undesirable compounds or reduced mineral content, respectively. Each option can be harmful to proper plant growth, as the added chemicals in tap water may negatively impact the plant's growth pattern, while the lacking minerals in many bottled waters may be necessary to encourage healthy plant growth. Frequently, individuals may purchase additional tools to ensure that the supplied water includes the sufficient minerals or is at a desired temperature or pH level, however such testing kits can be an expensive investment over the course of the plant's life. Alternatively, individual gardeners may choose to supplement the water with additional potting soils, fertilizer, or other materials that include additional materials that encourage plant growth, which can similarly increase expense.

Finally, in order to encourage efficient plant growth, many gardeners utilize plant training to encourage the plant to grow in particular directions to decrease overcrowding and increase light exposure over the surface area of the plant. This can produce plants with significantly higher yields than those with uncontrolled growth. However, typical indoor plant growth systems fail to provide a means for plant training. Therefore, an indoor plant growth receptacle with self-wicking capabilities and plant training support, such that the indoor plant can grow in a more efficient manner is desired.

In light of the devices disclosed in the known art, it is submitted that, the present invention substantially diverges in design elements from the known art and consequently it is clear that there is a need in the art for an improvement to existing plant growth systems. In this regard, the instant invention substantially fulfills these needs.

SUMMARY OF THE INVENTION

In view of the foregoing disadvantages inherent in the known types of plant, growth systems now present, in the known art, the present invention provides a plant growth receptacle wherein the same can be utilized for providing convenience for the user when providing filtered water to a plant within a grow bag such that the grow bag wicks moisture from a water reservoir as needed, while also providing several plant training apertures for manipulating the growth pattern of an existing plant.

The present system comprises a housing having a base opposite and upper side and a plurality of sidewalls extending therebetween. An upper opening is disposed through the upper side providing access to an interior volume dimensioned to removably receive a grow bag therein. A wick port is disposed through the base in fluid communication with the interior volume. A reservoir housing is securable to the base to define an assembled configuration. The reservoir housing includes a lower side and a perimeter sidewall defining a reservoir volume. A lip is disposed about a perimeter of the upper side, wherein the lip includes a plurality of apertures therethrough. A channel extends through the housing between an inlet on the upper side and an outlet on the base, wherein the channel is in fluid communication with the reservoir volume. A filter is removably secured within the channel.

In some embodiments, the lip is disposed coplanar with the plurality of sidewalls of the housing, in another embodiment, the plurality of apertures is disposed along the lip at regular intervals. In other embodiments, a reservoir support structure is disposed within the reservoir volume, wherein the reservoir support structure comprises a central member and a plurality of fins extending between the central member and the perimeter sidewalls of the reservoir housing, in yet another embodiment, the wick port is coaxially aligned with the central member of the reservoir support structure when the housing is disposed on the reservoir housing in the assembled configuration. In some embodiments, the plurality of fins is removably securable to the central member, in another embodiment, each fin of the plurality of fins includes a plate disposed perpendicularly on a proximal end of each fin, wherein the plate is slidably securable within a conduit disposed on the central member. In other embodiments, a plurality of slots is disposed through the central member of the reservoir support structure. In yet another embodiment, a plurality of slots is disposed through each fin of the plurality of fins. In some embodiments, the plurality of fins extends between the central member and each corner of the reservoir housing, in another embodiment, an overflow port is disposed through the perimeter sidewall of the reservoir housing. In other embodiments, the overflow port is disposed along an upper edge of the perimeter sidewall, such that the overflow port is aligned with a portion of the grow bag extending through the wick port. In yet another embodiment, the grow bag comprises a liquid permeable fabric material configured to wick liquid through an entirety thereof, in some embodiments, the grow bag further comprises a cup extending from a lower end thereof, wherein the cup is removably securable through the wick port. In another embodiment, a grow bag insert is removably securable within the grow bag, wherein the grow bag insert comprises a planar body having a projection extending from a lower surface of the planar body, wherein the projection distends a lower end of the grow bag to secure through the wick port. In other embodiments, the grow bag insert comprises a mesh, such that the grow bag insert is liquid permeable. In yet another embodiment, a pair of handles are disposed on an upper end of the grow bag. In some embodiments, the plurality of sidewalls of the housing are disposed coplanar with the perimeter sidewall of the reservoir housing when in the assembled configuration. In another embodiment, a lower portion of the interior volume about the wick port comprises a mesh. In other embodiments, the channel is disposed along a corner of the upper side adjacent to the open upper end.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
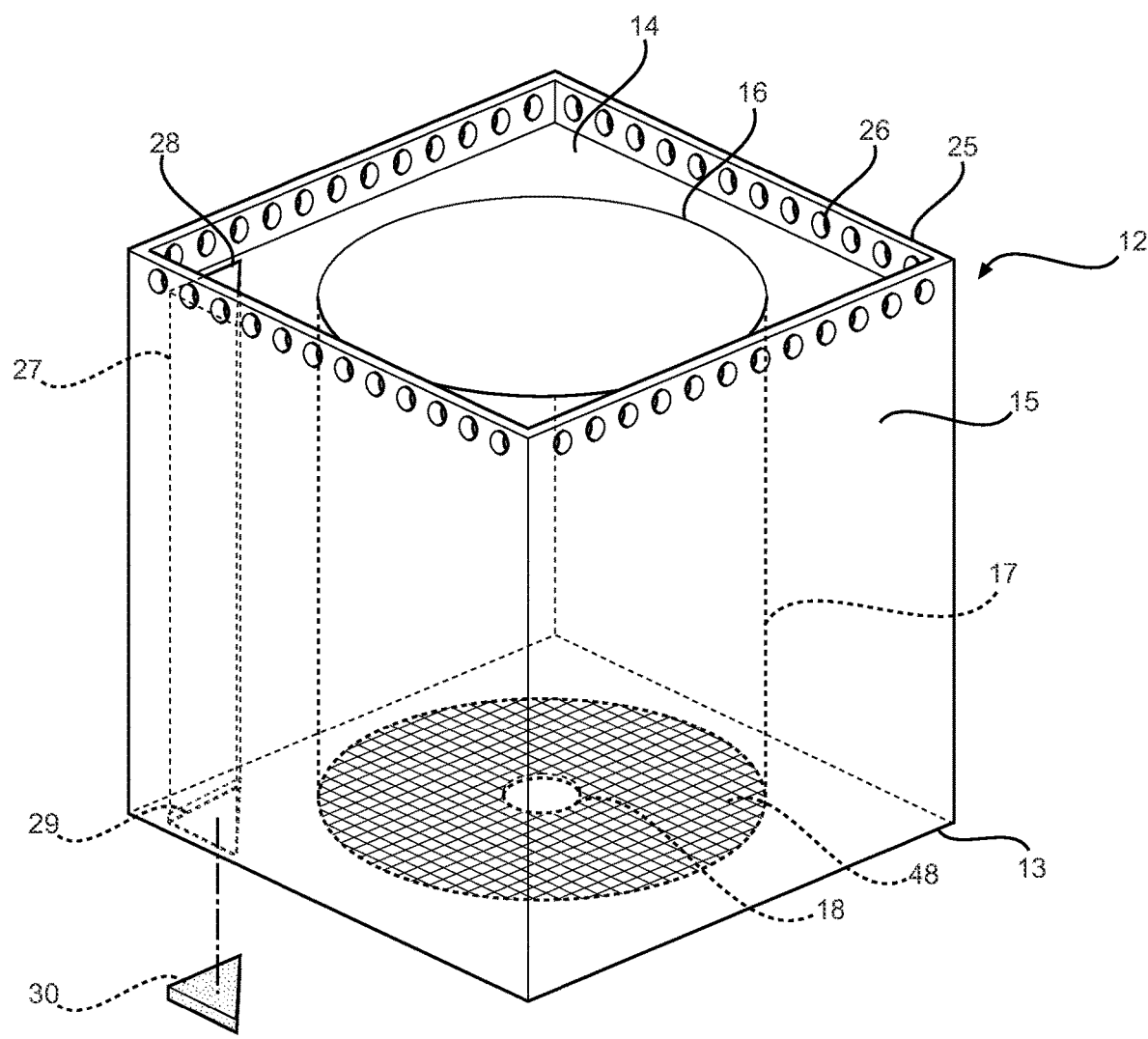
FIG. 1 shows a perspective view of the housing of an embodiment of the self wicking plant growth receptacle.

Reference is made herein to the attached drawings. Like reference numerals are used throughout the drawings to depict like or similar elements of the self-wicking plant growth receptacle. The figures are intended for representative purposes only and should not be considered to be limiting in any respect.

Figure 2:
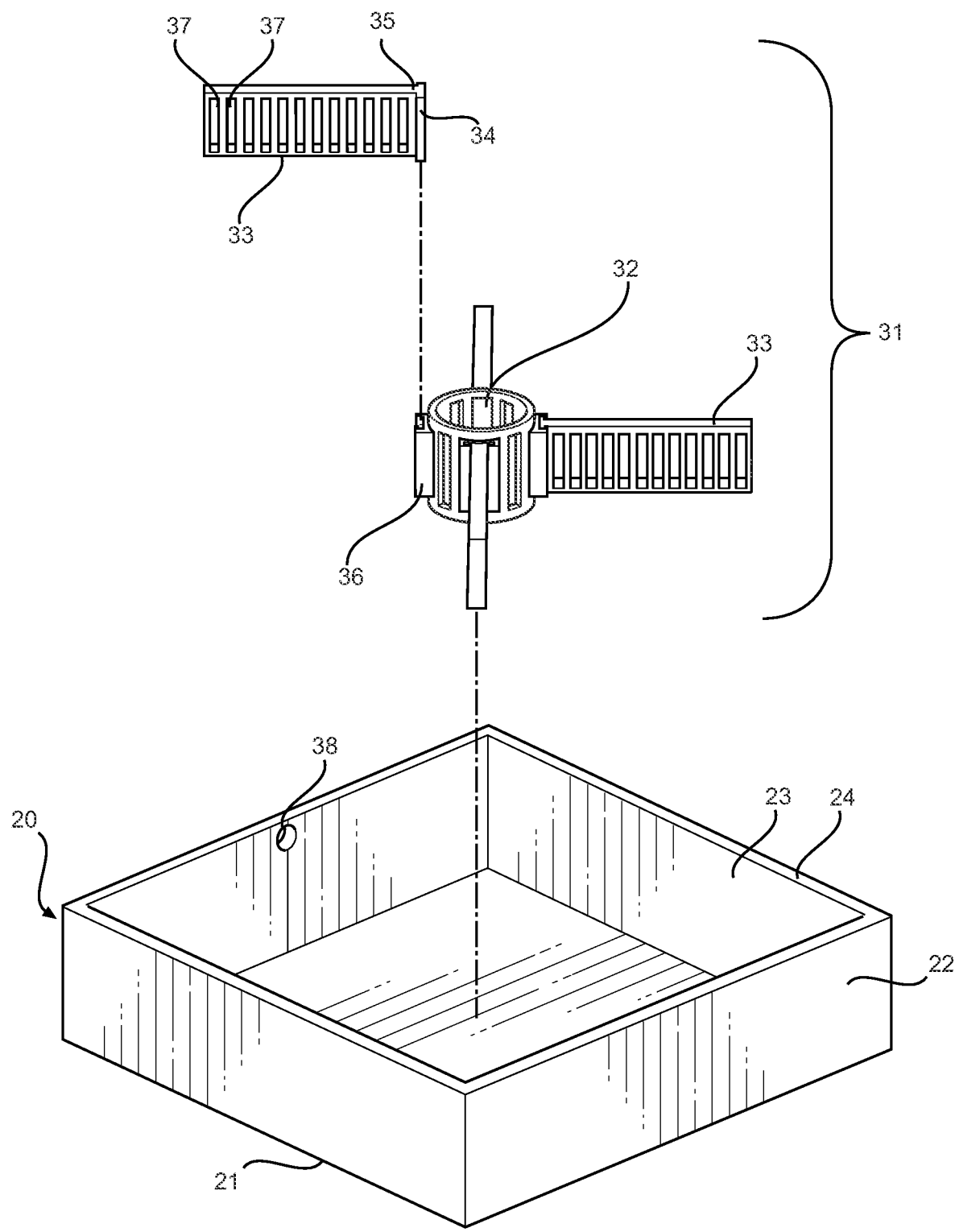
FIG. 2 shows an exploded view of the reservoir housing of an embodiment of the self-wicking plant growth receptacle.
Figure 3A:
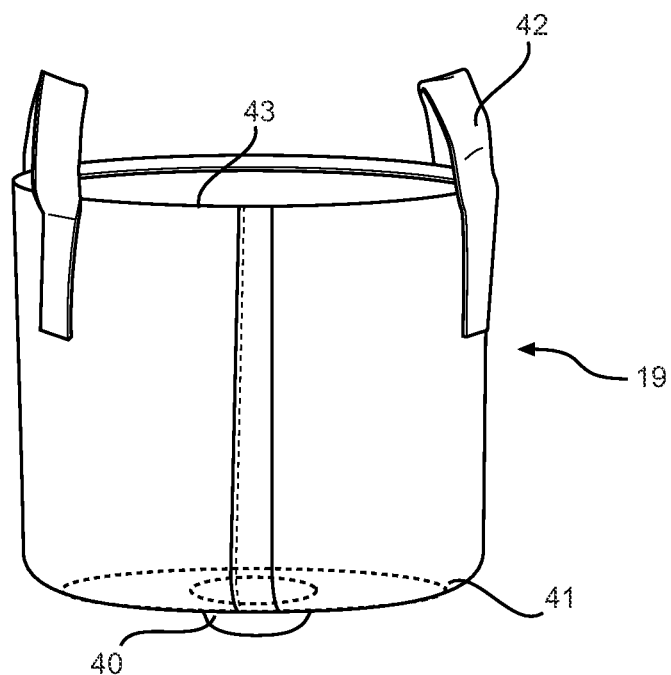
FIG. 3A shows a perspective view of the grow bag of an embodiment, of the self-wicking plant growth receptacle.
Figure 3B:
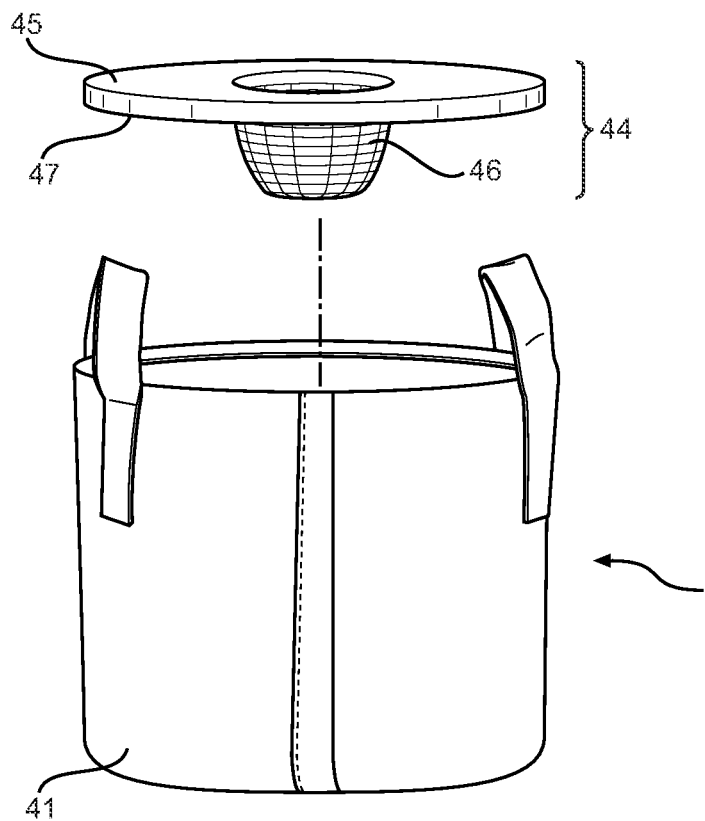
FIG. 3B shows a perspective view of the grow bag of an alternate embodiment of the self-wicking plant growth receptacle.

Referring now to FIG. 1, there is shown a perspective view of the housing of an embodiment of the self-wicking plant growth receptacle. The self-wicking plant growth receptacle (as shown in an assembled configuration in FIG. 4, 11) comprises a housing 12 having a base 13 opposite an upper side 14 with a plurality of sidewalls 15 extending therebetween. An upper opening 16 is disposed through the upper side 14 defines an interior volume 17 within the housing 12, wherein the interior volume 17 is dimensioned to removably receive a grow bag (as shown in FIGS. 3A and 3B, 19) therein. In the illustrated embodiment, the upper opening 16 is centrally disposed through the upper side 14, such that the interior volume 17 comprises a lesser volume than an entirety of the housing 12. Additionally, in the shown embodiment, the interior volume 17 defines a substantially cylindrical form factor to accommodate cylindrical grow bags. A wick port 18 is disposed through a lower portion 48 of the interior volume 17, wherein the wick port 18 extends through the base 13 of the housing 12. In this manner, a portion of the grow bag extends through the wick port 18 to contact water stored within a reservoir housing (as shown in FIG. 2, 20) to wick water through the grow bag and into soil disposed within the grow bag as further described elsewhere herein. In some embodiments, the lower portion 48 of the interior volume 17 about the wick port 18 comprises a mesh having a plurality of openings therethrough, thereby facilitating drainage of excess water from the grow bag disposed within the interior volume 17. Alternatively, in other embodiments, an entire wall of the interior volume 17 comprises a mesh having a plurality of openings therethrough to increase drainage capabilities further. In some embodiments, an upper portion of the interior volume 17 is angled radially inwardly to define a funnel shaped opening. In this manner, the grow bag is guided into the interior volume 17 and retained therein via the reduced cross-sectional area of the upper opening 16 relative to a diameter of the interior volume 17.

Figure 4:
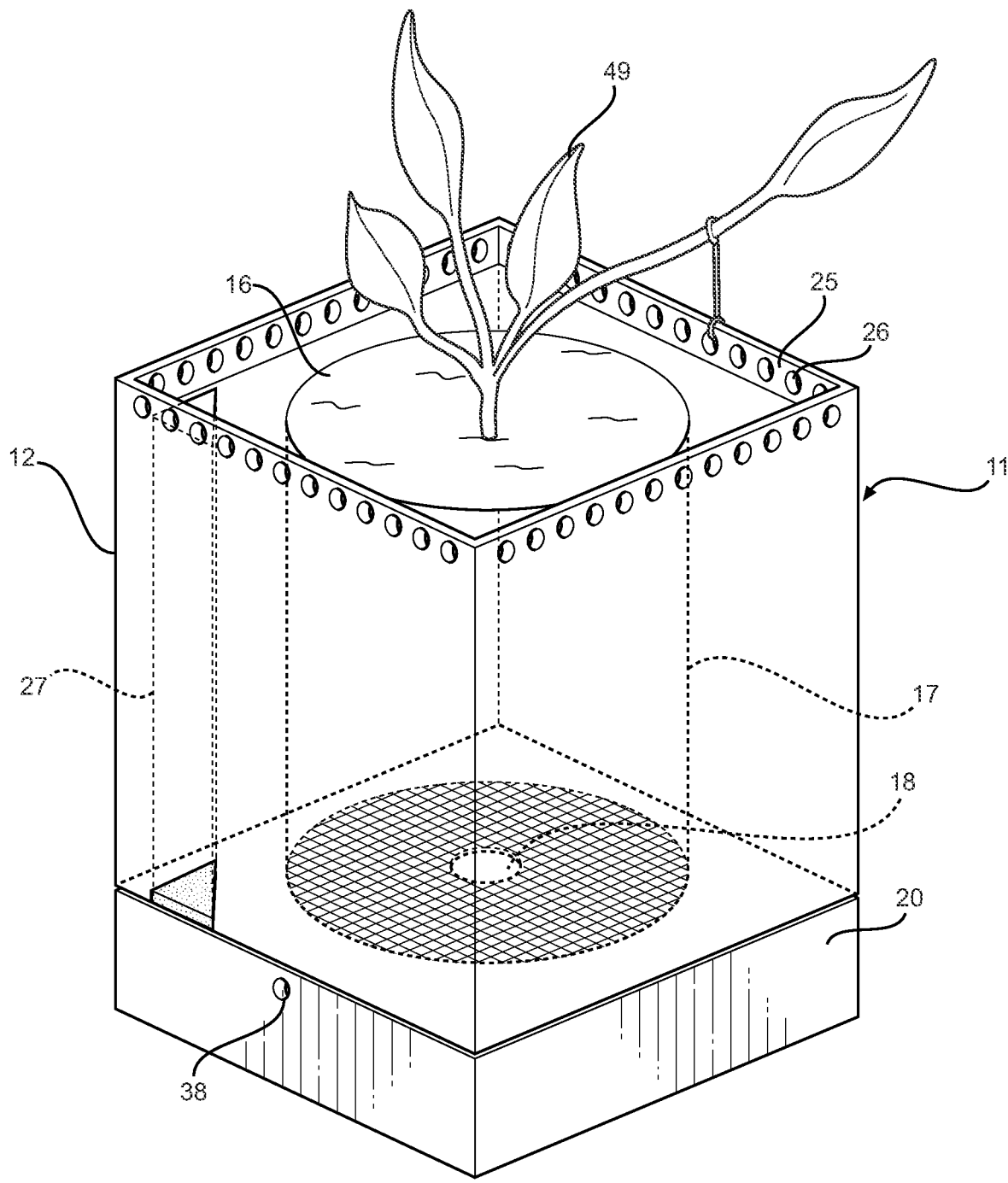
FIG. 4 shows a perspective view of an embodiment of the self-wicking plant growth receptacle in use.

A lip 25 is disposed about the perimeter of the upper side 14 of the housing 12, wherein the lip 25 includes a plurality of apertures 26 therethrough. The plurality of apertures 26 provide an anchor point for securing branches or sprouts (as shown in FIG. 4, 49) of a plant within the interior volume 17, thereby allowing the user to direct the growth of the plant in a desired direction via plant training. The user can secure the branch to an aperture of the plurality of apertures 26 via a wire, tie, string, or other fastener. Plant training provides several benefits for plant growth efficiency, preventing overcrowding of the plant and exposing a larger surface area of the plant to a light source for increased growth rates. In the illustrated embodiment, the lip 25 extends perpendicularly from the upper side 14 of the housing 12, such that the lip 25 is coplanar with the plurality of sidewalls 15. In this manner, the lip 25 does not extend beyond the plane of the plurality of sidewalls 15, thereby reducing the cross-sectional area of the housing 12 for increased efficiency of storage and use. In alternate embodiments, the lip 25 extends perpendicularly to the plurality of sidewalls 15 such that the lip 25 is coplanar with the upper side 14 of the housing 12. In such embodiments, the lip 25 is more readily accessible for affixing branches of the plant thereto as the lip 25 does not extend into the natural growth area of the plant.

A fill port extends through the housing 12, wherein the fill port comprises a channel 27 extending between an inlet 28 disposed through the upper side 14 and an outlet 29 disposed through the base 13, such that a user can refill the reservoir housing disposed below the housing 12 while the self-wicking plant growth receptacle is in the assembled configuration. In the illustrated embodiment, the channel 27 is distinct and separate from the interior volume 17, such that water poured through the channel 27 does not overwater the plant within the interior volume 17. In the shown embodiment, the channel 27 is disposed along a corner of the housing 12, such that, the channel 27 can be kept separate from the interior volume 17, while also being disposed adjacent to an edge of the upper side 14 to facilitate access while a plant is growing from the interior volume 17. A filter 30 is removably securable within the channel, wherein the filter 30 is configured to remove contaminates and other potentially harmful materials from water poured through the channel 27, thereby ensuring that the water provided to the plant is purified for optimal plant growth. In some embodiments, the filter 30 comprises a carbon filter. In the shown embodiment, the filter 30 is removably securable within the channel 27 adjacent to the outlet 29, such that the user can fill the channel 27 with water to accommodate a slow drip filtration process through the filter 30. In this manner, the user need not be present for extended periods in embodiments with a dense filter 30 material.

Referring now to FIG. 2, there is shown an exploded view of the reservoir housing of an embodiment of the self-wicking plant growth receptacle. The reservoir housing 20 comprises a lower side 21 having a perimeter sidewall 22 disposed about a perimeter of the lower side 21 and an open upper end 24 defining a reservoir volume 23 therein. The reservoir housing 20 is configured to retain a liquid, such as water, therein, such that when the self-wicking plant growth receptacle is in the assembled configuration, the water is in contact with the grow bag via the wick port. The reservoir housing 20 is dimensioned to removably secure the housing thereon, such that the self-wicking plant growth receptacle is secured in the assembled configuration, in some embodiments, the plurality of sidewalls of the housing and the perimeter sidewall 22 of the reservoir housing 20 are coplanar when in the assembled configuration to reduce the form factor of the receptacle in use. The housing is contemplated to rest, on the reservoir housing 20, or alternatively, secure to the reservoir housing 20 via frictional engagement. In this manner, the device remains in the assembled configuration, such as when the device is moved from one location to another. In the illustrated embodiment, the reservoir housing 20 further comprises an overflow port 38 disposed through the perimeter sidewall 22 adjacent to the open upper end 24, such that excess water poured into the reservoir housing 20 via the channel can escape the reservoir volume 23 via the overflow port 38. In some embodiments, the overflow port 38 is disposed at a height along the perimeter sidewall 22 such that a lowermost point of the grow bag extends beyond the overflow port 38 to ensure that the lowermost point of the grow bag is in contact with the water within the reservoir volume 23. In this manner, the water within the reservoir volume 23 cannot extend into the housing to submerge the grow bag or interior volume therein, thereby ensuring proper distribution of water through the grow bag via wicking action and preventing overwatering.

In the illustrated embodiment, a reservoir support structure 31 is removably securable within the reservoir volume 23, wherein the reservoir support structure 31 receives the housing thereon when in the assembled configuration, in this manner, the housing is supported on the reservoir housing 20 in an elevated position above the reservoir volume 23. In the shown embodiment, the reservoir support structure 31 comprises a central member 32 having a plurality of fins 33 affixed thereto. The plurality of fins 33 are contemplated to extend between the central member 32 and each corner of the reservoir housing 20 to prevent lateral shifting of the reservoir support structure 31 during operation. In some embodiments, the wick port is coaxially aligned with the central member 32 when in the assembled configuration, such that the grow bag extends through the wick port and into the central member 32. In the illustrated embodiment, the central member 32 and each fin of the plurality of fins 33 comprise a plurality of slots 37 therethrough, such that the reservoir support structure 31 does not impede the movement of water through the reservoir housing 20. In this manner, when in the assembled configuration, the water within the reservoir volume 23 enters the central member 32 to contact the grow bag therein. In the shown embodiment, the central member 32 comprises a cylindrical form factor having a plurality of conduits 36 disposed on an exterior surface thereof, wherein each of the plurality of conduits 36 is dimensioned to removably receive a plate 34 disposed perpendicularly on a proximal end 35 of each fin of the plurality of fins 33 therein, in this manner, the plurality of fins 33 can be removably securable to the central member 32 to allow the user to configure the reservoir support structure 31 is a variety of desired configurations or disassemble the reservoir support structure 31 for storage. In some embodiments, the plurality of conduits 36 comprise a C-shaped member that prevents the plate 34 from being removed via applied lateral forces, such that the plurality of fins 33 are removably securable via sliding the plate 34 through the longitudinal axis of each conduit 36.

Referring now to FIGS. 3A and 3B, there is shown a perspective view of the grow bag of an embodiment of the self-wicking plant growth receptacle and a perspective view of the grow bag of an alternate embodiment of the self-wicking plant, growth receptacle, respectively. In the shown embodiment of FIG. 3A, the grow bag 19 comprises a container having a cup 40 integrally affixed to a lower end 41 of the grow bag 19, wherein the cup 40 is dimensioned to removably secure through the wick port disposed in the base of the housing. In this manner, the cup 40 extends into the reservoir volume to contact the water therein. The grow bag 19 is contemplated to include an absorbent fabric material capable of wicking liquid through an entirety of the grow bag 19, such that upon the cup 40 contacting water, the water is transferred upwardly through the entirety of the grow bag 19 wetting any soil therein. In this manner, capillary action of each of the soil and grow bag 19 material control the rate of water application to the plant, thereby minimizing the risk of improper water application, such as overwatering or underwatering. In the illustrated embodiments, the grow bag 19 further comprises a pair of handles 42 disposed on an upper end 43 of the grow bag 19, wherein the pair of handles 42 provide a grasping means for removing the grow bag 19 from the interior volume of the housing as necessary.

In the alternative embodiment of FIG. 3B, the grow bag 19 comprises a traditional substantially cylindrical form factor, such as other commercially available grow bags 19. In order to retrofit existing grow bags 19 to operate with the present system, a grow bag insert 44 is contemplated to distend the lower end 41 of the grow bag 19 to extend through the wick port disposed within the interior volume. As such, a traditional grow bag 19 can contact the water within the reservoir volume. The grow bag insert 44 comprises a planar body 45 having a projection 46 extending from a lower surface 47 of the planar body 45. In the shown embodiment, the projection 46 is dimensioned to removably secure within the wick port via frictional engagement through the grow bag 19, such that the grow bag 19 is secured within the wick port. In the shown embodiment, the projection 46 comprises a hemi spherical form factor to minimize the stress applied to the grow bag 19 to reduce the risk of tearing the grow bag 19 upon securement to the wick port. In some embodiments, the grow bag insert 44 comprises a mesh material having a plurality of openings therethrough, such that the grow bag insert 44 is water permeable. In this manner, water passing through the grow bag 19 is unimpeded by the presence of the grow bag insert 44.

Referring now to FIG. 4, there is shown a perspective view of an embodiment of the self-wicking plant growth receptacle in use. In one use, the self-wicking plant growth receptacle 11 is placed in the assembled configuration as shown, wherein the housing 12 is removably secured to the reservoir housing 20. A grow bag can be inserted within the interior volume 17 through the upper opening 16, wherein the grow bag includes potting soil and a plant or plant seeds therein. The lower portion of the grow bag can be inserted through the wick port 18 to allow the grow bag to contact water within the reservoir housing 20. The user can then refill the reservoir housing 20 to ensure sufficient water is present to be wicked through the grow bag to wet the soil via pouring replacement water through the channel 27 via the inlet in the upper side of the housing 12. The water then passes through the filter to ensure that contaminants and other substances potentially harmful to the plant are removed thereby. Should the reservoir housing 20 be overfilled, the excess water seeps through the overflow port 38. In this manner, the user can gauge when the reservoir housing 20 is full via seepage through the overflow port 38. Once the plant grows to a sufficient length, individual branches or sprouts 49 of the plant can be trained via securement to an aperture of the plurality of apertures 26 disposed through the lip 25. In this manner, the user can efficiently grow a desired plant indoors to increase yields with minimal monitoring and effort.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-wicking plant growth receptacle, comprising:
   a housing having a base opposite an upper side and a plurality of sidewalls extending therebetween;
   an upper opening disposed through the upper side providing access to an interior volume of the housing;
   wherein the interior volume is dimensioned to removably receive a fabric grow bag therein;
   a wick port disposed through the base in fluid communication with the interior volume;
   a reservoir housing having a lower side and a perimeter sidewall extending therefrom defining a reservoir volume;
   wherein the base of the housing is securable to an open upper end of the reservoir housing to define an assembled configuration;
   a reservoir support structure disposed within the reservoir volume;
   wherein the reservoir support structure a central member and a plurality of fins extending between the central member and the perimeter sidewalls of the reservoir housing;
   wherein the plurality of fins is removably securable to the central member;
   wherein each fin of the plurality of fins includes a plate disposed perpendicularly on a proximal end of each fin, wherein the plate is slidably securable within a conduit disposed on the central member;
   a lip disposed about a perimeter of the upper side of the housing, wherein the lip includes a plurality of apertures therethrough;
   a channel extending through the housing between an inlet disposed through the upper side of the housing and an outlet disposed through the base of the housing;
   wherein the channel is in fluid communication with the reservoir volume and is separate from the interior volume;
   a filter removably secured within the channel.

2. The self-wicking plant growth receptacle of claim 1, wherein the lip is disposed coplanar with the plurality of sidewalls of the housing.

3. The self-wicking plant growth receptacle of claim 1, wherein the plurality of apertures is disposed along the lip at regular intervals.

4. The self-wicking plant growth receptacle of claim 1, wherein the wick port is coaxially aligned with the central member of the reservoir support structure when the housing is disposed on the reservoir housing in the assembled configuration.

5. The self-wicking plant growth receptacle of claim 1, wherein a plurality of slots is disposed through the central member of the reservoir support structure.

6. The self-wicking plant growth receptacle of claim 1, wherein a plurality of slots is disposed through each fin of the plurality of fins.

7. The self-wicking plant growth receptacle of claim 1, wherein the plurality of fins extends between the central member and each corner of the reservoir housing.

8. The self-wicking plant growth receptacle of claim 1, further comprising an overflow port disposed through the perimeter sidewall of the reservoir housing.

9. The self-wicking plant growth receptacle of claim 8, wherein the overflow port is disposed along an upper edge of the perimeter sidewall, such that the overflow port is aligned with a portion of the grow bag extending through the wick port.

10. The self-wicking plant growth receptacle of claim 1, wherein the grow bag comprises a liquid permeable fabric material configured to wick liquid through an entirety thereof.

11. The self-wicking plant growth receptacle of claim 1, wherein the grow bag further comprises a cup extending from a lower end thereof, wherein the cup is removably securable through the wick port.

12. The self-wicking plant growth receptacle of claim 1, further comprising a grow bag insert removably securable within the grow bag, wherein the grow bag insert comprises a planar body having a projection extending from a lower surface of the planar body, wherein the projection distends a lower end of the grow bag to secure through the wick port.

13. The self-wicking plant growth receptacle of claim 12, wherein the grow bag insert comprises a mesh, such that the grow bag insert is liquid permeable.

14. The self-wicking plant growth receptacle of claim 1, further comprising a pair of handles on an upper end of the grow bag.

15. The self-wicking plant growth receptacle of claim 1, wherein the plurality of sidewalls of the housing are disposed coplanar with the perimeter sidewall of the reservoir housing when in the assembled configuration.

16. The self-wicking plant growth receptacle of claim 1, wherein a lower portion of the interior volume about the wick port comprises a mesh.

17. The self-wicking plant growth receptacle of claim 1, wherein the channel is disposed along a corner of the upper side adjacent to the open upper end.

* * * * *